(12) United States Patent
Lin et al.

(10) Patent No.: US 9,081,545 B1
(45) Date of Patent: Jul. 14, 2015

(54) EXTERNAL CONTROL PAD

(71) Applicant: Giga-Byte Technology Co., Ltd., New Taipei City (TW)

(72) Inventors: Yin Yu Lin, New Taipei (TW); Po-Jen Shih, New Taipei (TW); Shu-I Chen, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/196,381

(22) Filed: Mar. 4, 2014

(30) Foreign Application Priority Data

Jan. 17, 2014 (TW) .................................. 103200996

(51) Int. Cl.
| | |
|---|---|
| *H05K 5/00* | (2006.01) |
| *H05K 7/00* | (2006.01) |
| *E04G 3/00* | (2006.01) |
| *G06F 1/16* | (2006.01) |

(52) U.S. Cl.
CPC .................................. *G06F 1/1632* (2013.01)

(58) Field of Classification Search
CPC .............................. G06F 1/1615; F16M 13/02
USPC ............... 361/679.01–679.09, 679.1–679.19, 361/679.21–679.29, 361/679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8; 292/1–62, 113, 292/169.11–169.23, 341.11–341.19
See application file for complete search history.

(56) References Cited

U.S. PATENT DOCUMENTS

| | | | | |
|---|---|---|---|---|
| 6,115,247 | A * | 9/2000 | Helot | ........................ 361/679.44 |
| 2003/0142070 | A1* | 7/2003 | Gartrell et al. | ................ 345/156 |

FOREIGN PATENT DOCUMENTS

DE    19621014 C1 *  5/1997

* cited by examiner

*Primary Examiner* — Jerry Wu
(74) *Attorney, Agent, or Firm* — Chun-Ming Shih (57) ABSTRACT

An external control pad for incorporating a mobile device includes two handheld parts, a movable set, and two fastening mechanisms is provided. The movable set is disposed in between the two handheld parts, and each said fastening mechanism is disposed on the movable set. When placing the mobile device in between the two handheld parts, a user adjusts the distance between the two handheld parts by altering the movable set such that the two handheld parts move closer to or away from, the mobile device. The fastening mechanisms for securing the distance posed by the movable set allows the mobile device to be clamped and fixed in between the two handheld parts so that the mobile device is incorporated into the external control pad for users' convenience and ease of use.

10 Claims, 8 Drawing Sheets

EXTERNAL CONTROL PAD

CROSS REFERENCE TO RELATED APPLICATIONS

This non-provisional application claims priority claim under 35 U.S.C. §119(a) on Patent Application No. 103200996 filed in Taiwan, R.O.C. on Jan. 17, 2014, the entire contents of which are hereby incorporated by reference herein.

BACKGROUND OF THE INVENTION

1. Field of the Invention

The present invention relates to a control pad and, more particularly, to an external control pad for incorporating a mobile device.

2. Description of Related Art

Mobile devices, which integrate multiple functions including mobile communicating, Internet surfing, and gaming, among others, have brought an unprecedented impact to related industries since their inception on the market. Such versatility, a feature that appeals to mobile consumers, has also driven developers/providers of mobile applications (or apps) to develop more apps running on mobile devices such as smart phones, tablet computers, and digital players (e.g., iPhones, iPads, or iPods, and the like). It is estimated that more than one million apps for mobile devices have been produced up to present. Among the apps for mobile devices, gaming app, undoubtedly, is the most favorable type of app in the market. Most of the gaming apps are created based on the hardware components built in mobile devices, thereby providing more diversified operations to game players.

For prior-art joysticks (or gamepads) as accessories to the smart phones or tablet computers, the fastening mechanism or connecting apparatus of which is only compatible to a particular type of model or manufacture and may not be easy to use, and thus the game players may find it difficult to quickly adjust the gamepad according to different dimensions of mobile devices in use; additionally, the gamepad may be too bulky to be carried on-the-go, causing inconvenience to the game players.

What is needed, therefore, is a control pad which can be easily and quickly adjusted to incorporate mobile devices with different dimensions/types and be easily held for carry.

BRIEF SUMMARY OF THE INVENTION

In view of the foregoing, an external control pad over conventional gamepads is provided to overcome the above-mentioned problems that the fastening mechanism or connecting apparatus of a prior-art gamepad is only compatible to a particular type of model or manufacture and may not be easy to use, thus making it difficult to quickly adjust the gamepad according to different dimensions of mobile devices, and the gamepad may be too bulky to be carried on-the-go, causing inconvenience to the game players.

The present invention provides an external control pad for incorporating a mobile device. The external control pad includes: two handheld parts individually provided with at least one control button, where a mobile device can be placed in between the two handheld parts; a movable set composed of a first connecting lever, a second connecting lever, and at least one middle connecting lever, where one end of the first connecting lever is axially disposed on one handheld part and one end of the second connecting lever is axially disposed on the other handheld part, and the two ends of the middle connecting lever are pivotally connected to the other end of the first connecting lever and the other end of the second connecting lever respectively, and when the first connecting lever and the second connecting lever individually rotate with respect to the two handheld parts so as to enable the middle connecting lever to pivotally rotate, the two handheld parts will move away from or close to, each other; and two fastening mechanisms individually disposed in the first connecting lever and the second connecting lever and individually composed of an elastic element and a pressing component, where one elastic element is disposed between one pressing component and the first connecting lever and the other elastic element is disposed between the other pressing component and the second connecting lever, and one end of each said pressing component abuts against the corresponding elastic element and the other end of each said pressing component abuts against the middle connecting lever such that the middle connecting lever is pressingly fixed in between each said elastic element and each said pressing component, and when the first connecting lever and/or the second connecting lever displace along the direction of pressing so as to abut against the corresponding elastic element, one end of the corresponding pressing component will displace along the direction of pressing and the other end of the corresponding pressing component will release the middle connecting lever.

In one embodiment of the present invention, the first connecting lever and the second connecting lever are individually provided with an upper connecting lever and a lower connecting lever connecting to each other via an axle, and each said fastening mechanism is disposed, through the same axle, between the corresponding upper connecting lever and the corresponding lower connecting lever.

In one embodiment of the present invention, the pressing component is provided with a spring piece disposed between the lower connecting lever and the pressing component such that the pressing component will, in a normal setting, press against the direction of pressing. When the upper connecting lever displaces along the pressing direction so as to enable the pressing component to displace along the same direction, the spring piece produces a force of rebound in response to the pressure from the pressing component and the lower connecting lever, making the pressing component rebound against the direction of pressing.

In one embodiment of the present invention, there are individually disposed two cushioning elements on the lateral side of each of the handheld parts, where the cushioning element is made of soft material and the mobile device is clamped and fixed in between the two handheld parts through the two cushioning elements.

In one embodiment of the present invention, there is further provided a port on any one of the handheld parts for electrically connecting to the mobile device.

In one embodiment of the present invention, there is further mounted a wireless module on any one of the handheld parts for receiving control signals from the mobile device or sending control signals to the mobile device.

In one embodiment of the present invention, there is further provided a groove along the bottom side of each of the handheld parts such that the movable set and the two fastening mechanisms can be collapsed into the grooves.

In one embodiment of the present invention, there is further provided a joystick on each of the handheld parts.

In one embodiment of the present invention, the control button is either a direction button or a function button.

In one embodiment of the present invention, the elastic element is made of rubber or foam.

The advantageous effect of the present invention over conventional gamepads is that the structures of the movable set and the fastening mechanisms enable the user to easily adjust the distance between the two handheld parts according to different requirements such that mobile devices with different dimensions can be incorporated into the external control pad of the present invention for better applicability. Additionally, the movable set and the fastening mechanisms are collapsible into the grooves of the handheld parts so as for the two handheld parts to move as close to each other as possible, thus making the external control pad smaller in dimension for easy-to-carry and convenient-to-store.

BRIEF DESCRIPTION OF THE SEVERAL VIEWS OF DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE PREFERRED EMBODIMENTS

Two preferred embodiments of the present invention are provided, where the embodiments are exemplified by combinations of different structures of the external control pad 100. It should be understood by one skilled in the art that the embodiments are provided for illustrative purposes only but not intended to limit the scope of the present invention, and thus one skilled in the art should be able to change the disclosed elements to better fit different requirements.

Figure 4:
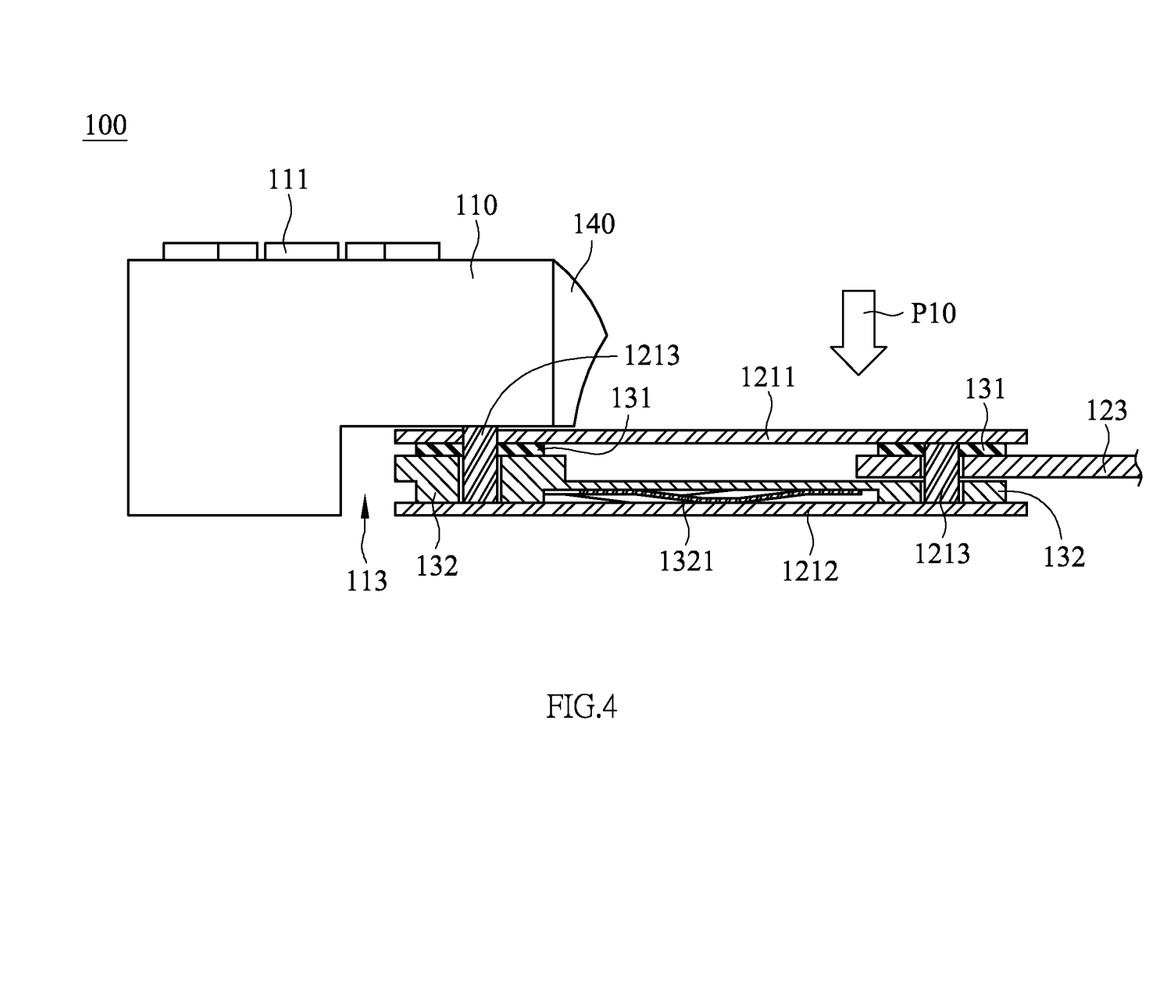
FIG. 4 is a schematic drawing of the movable set and the fastening mechanism of an external control pad illustrating their operations according to the first embodiment of the present invention.
Figure 5:
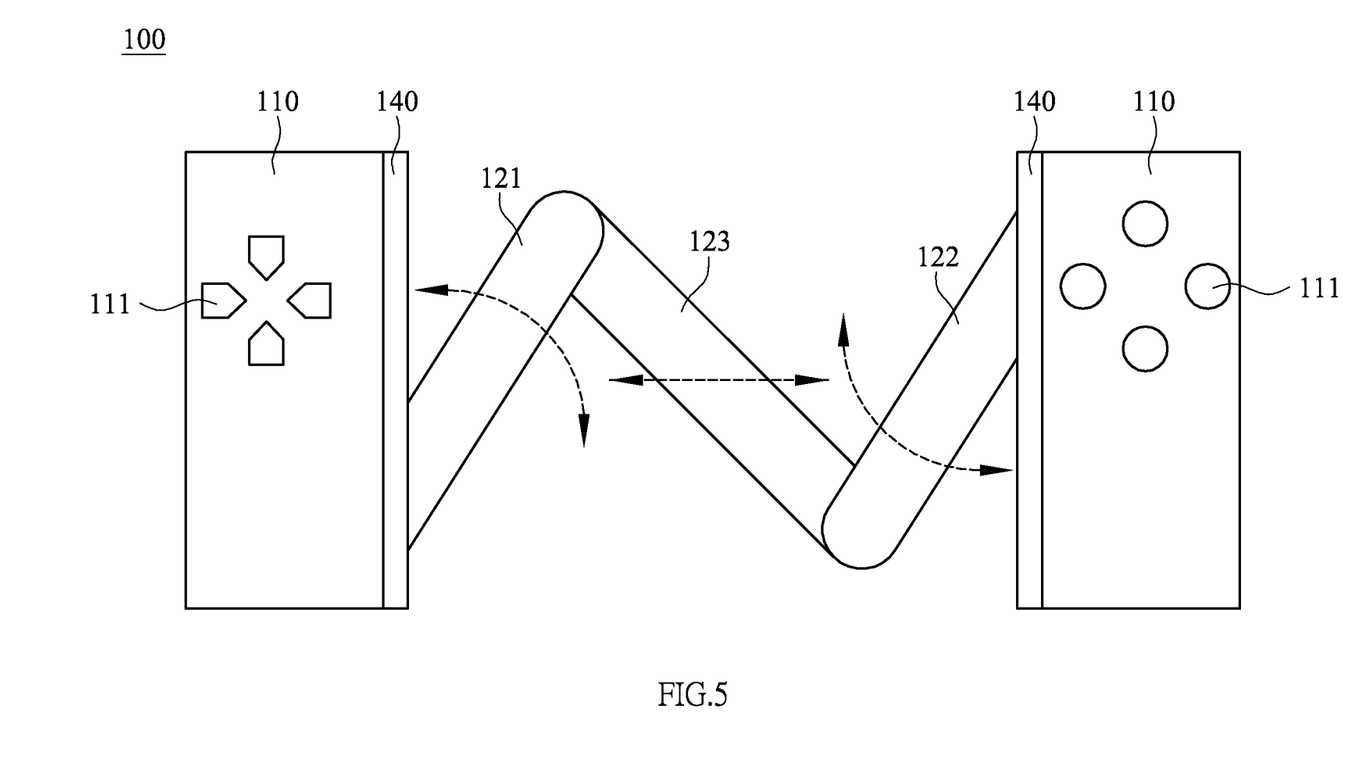
FIG. 5 is a schematic drawing of an external control pad when in operation according to the first embodiment of the present invention.
Figure 6:
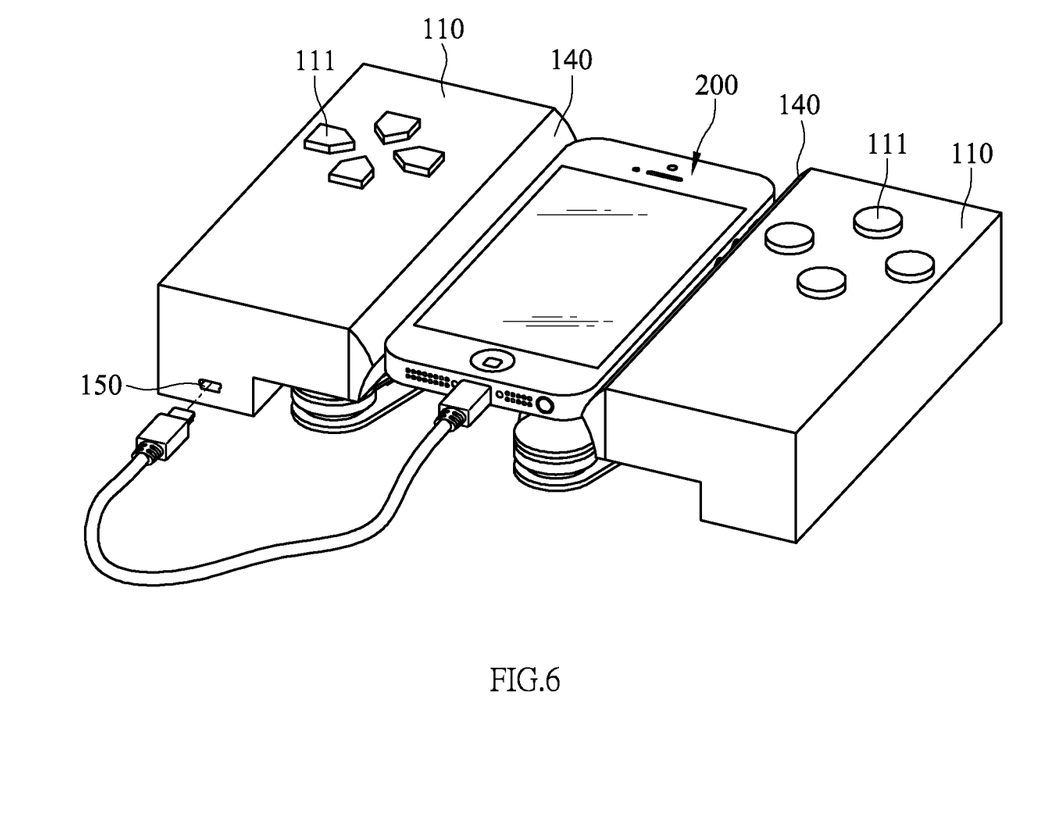
FIG. 6 is a perspective view of an external control pad incorporating a mobile device according to the first embodiment of the present invention.

Referring to FIGS. 1-5, there are shown a perspective view and a sectional view for an external control pad according to the first embodiment of the present invention. Referring to FIG. 6 with reference to FIGS. 1-5, there is shown a perspective view for the external control pad incorporating a mobile device. In the present embodiment, the external control pad 100 incorporates a mobile device 200 so as to enable the user to control the apps running on the mobile device 200 through the external control pad 100. Where the mobile device 200 is, for example, a smart phone, a tablet computer, or a digital player. The mobile device 200 of the present embodiment is exemplified by but not limited to, a smart phone.

In the present embodiment, the external control pad 100 includes two handheld parts 110, a movable set 120, and two fastening mechanisms 130, where the movable set 120 is disposed between the two handheld parts 110 and the two fastening mechanisms 130 are individually disposed on the movable set 120. When placing the mobile device 200 in between the two handheld parts 110, the user adjusts the distance between the two handheld parts 110 by altering the movable set 120 such that the two handheld parts 110 move closer to or away from, the mobile device 200. The fastening mechanisms 130 for securing the distance posed by the movable set 120 allows the mobile device 200 to be clamped and fixed in between the two handheld parts 110 so that the mobile device 200 is incorporated into the external control pad 100 for convenience and ease of use.

The structure and operation for each part of the external control pad 100 of the present embodiment will be detailed below. The two handheld parts 110 are individually provided with at least one control button 111 and a groove 113. Each of the control buttons 111 is, for example, a direction button or a function button, through which the user can control the apps running on the mobile device 200. The grooves 113, established at the bottom of the corresponding handheld parts, are used for storing the movable set 120 and the two fastening mechanisms 130. The mobile device 200 is placed between the two handheld parts 110 such that the user can effortlessly control the apps by simultaneously holding the two sides of the two handheld parts 110 with his/her hands.

Figure 1:
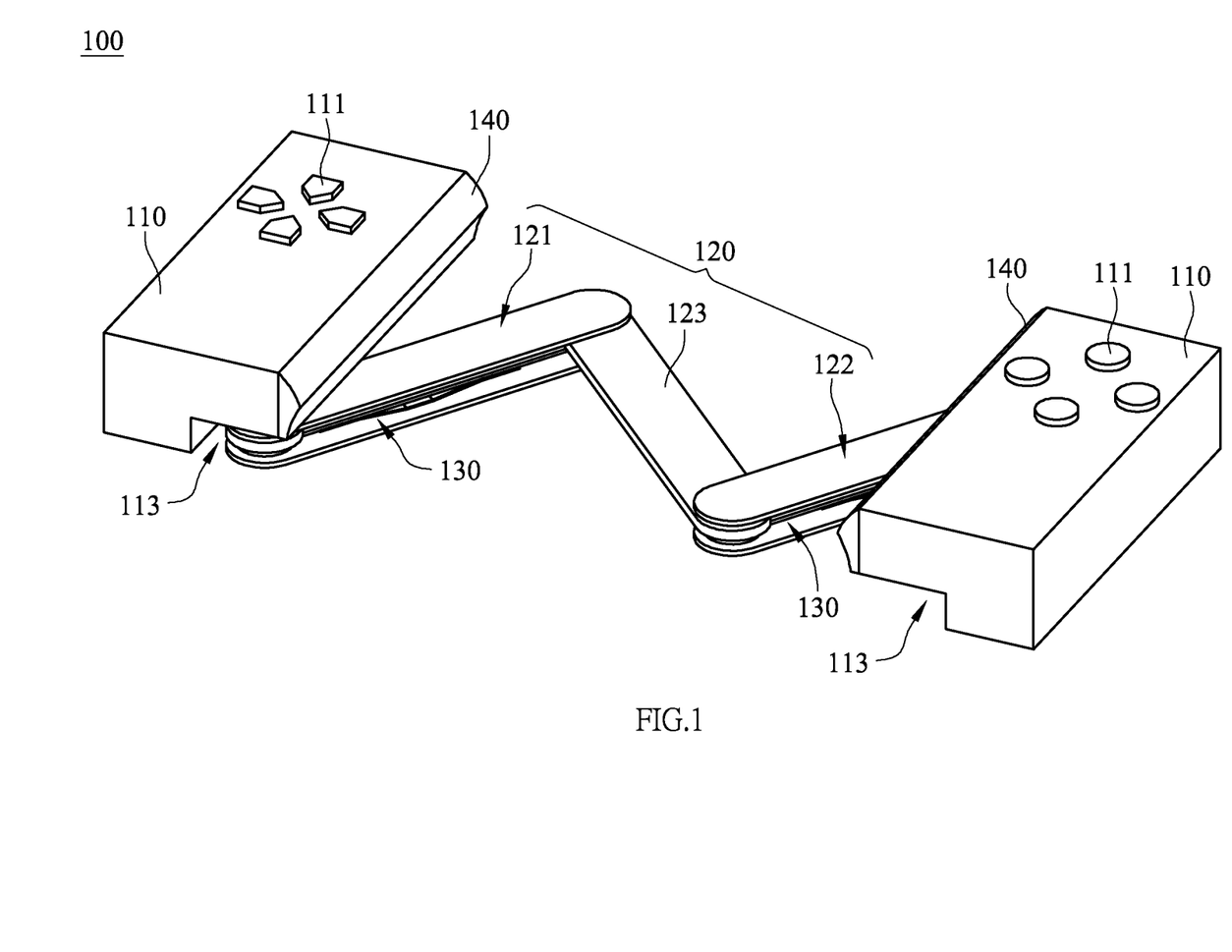
FIG. 1 is a perspective view of an external control pad according to the first embodiment of the present invention.
Figure 2:
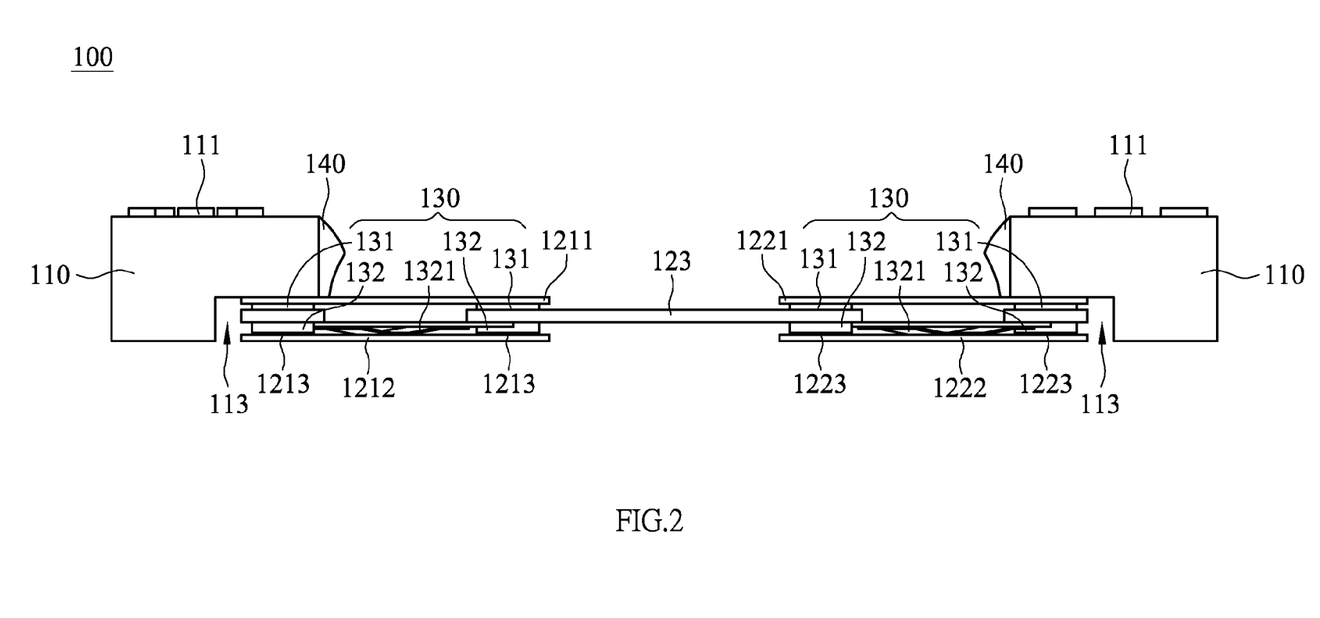
FIG. 2 is a sectional assembled view of an external control pad according to the first embodiment of the present invention.
Figure 3:
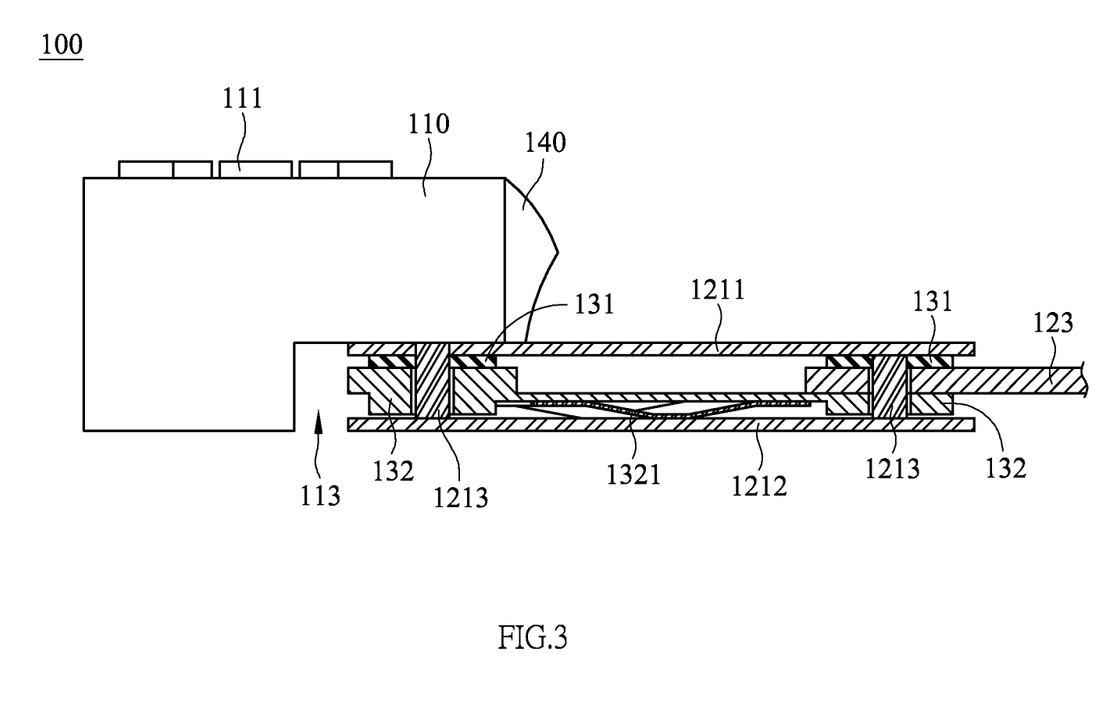
FIG. 3 is a partially enlarged view showing the movable set and the fastening mechanism according to the first embodiment of the present invention.

The movable set 120 includes a first connecting lever 121, a second connecting lever 122, and at least one middle connecting lever 123. One end of the first connecting lever 121 is, via an axle, flexibly disposed at the bottom of one handheld part 110, and one end of the second connecting lever 122 is, via another axle, flexible disposed at the bottom of the other handheld part 110, and the two ends of the middle connecting lever 123 are pivotally connected to the other end of the first connecting lever 121 and the other end of the second connecting lever 122 respectively. When the two handheld parts 110 move away from each other, the first connecting lever 121 and the second connecting lever 122 stretch out the grooves 113 by rotating axially, enabling the middle connecting lever 123 to pivotally rotate in horizontal direction, such that the distance apart from the two handheld parts 110 becomes longer. On the other hand, when the two handheld parts 110 move closer to each other, the first connecting lever 121 and the second connecting lever 122 retract into the grooves 113 by rotating axially, enabling the middle connecting lever 123 to pivotally rotate in vertical direction, such that the distance apart from the two handheld parts 110 becomes shorter.

Further, the first connecting lever 121 includes an upper connecting lever 1211 and a lower connecting lever 1212, where the upper connecting lever 1211 is connected to the lower connecting lever 1212 via an axle 1213. The second connecting lever 122 includes an upper connecting lever 1221 and a lower connecting lever 1222, where the upper connecting 1221 is connected to the lower connecting lever 1222 via an axle 1223. One of the fastening mechanisms 130 is pierced through by the axle 1213 and disposed between the upper connecting lever 1211 and the lower connecting lever 1212 of the first connecting lever 121, and the other one of the fastening mechanism 130 is pierced through by the axle 1223 and disposed between the upper connecting lever 1221 and the lower connecting lever 1222 of the second connecting lever 122.

Further, as shown in FIGS. 2 and 3, the two fastening mechanisms 130 are individually composed of an elastic element 131 and a pressing component 132, and are disposed in the first connecting lever 121 and the second connecting lever 122 respectively. For the first connecting lever 121, the elastic element 131 and the pressing component 132 are pierced through by the axle 1213 and disposed between the upper connecting lever 1211 and the lower connecting lever 1212. The elastic element 131 is disposed between the pressing component 132 and the upper connecting lever 1211, and is made of, but not limited to, rubber or foam. The pressing component 132 includes a spring piece 1321, and the spring piece 1321 is disposed between the lower connecting lever 1212 and the pressing component 132, making the pressing component 132, in a normal setting, pressed upward. One end of the pressing component 132 upward presses the elastic element 131 and the other end of the pressing component 132 upward presses the middle connecting lever 123 such that the middle connecting lever 123 is clamped and fixed between the elastic element 131 and the pressing component 132 without being pivotally rotated, thereby fastening the middle connecting lever 123.

Referring to FIG. 4 with reference to FIGS. 2 and 3, when the upper connecting lever 1211 of the first connecting lever 121 displaces along a direction of pressing P10 (the mark arrow), the upper connecting lever 1211 will downward press the elastic element 131 so as to enable one end of the pressing component 132 to displace downward; at the same time, the other end of the pressing component 132 will displace downward accordingly and thus release the middle lever 123, enabling the middle connecting lever 123 to pivotally rotate so as to adjust the distance between the two handheld parts 110.

It should be mentioned that when the upper connecting lever 1211 displaces along the direction of pressing P10, the pressing component 132 also displaces downward, and the spring piece 1321 generates a force of rebound against the pressure from the pressing component 132 and the lower connecting lever 1212 so as to enable the pressing component 132 to rebound against the direction of pressing P10, thereby achieving the effect of resetting the pressing component 132.

Referring to the description regarding the first connecting lever 121, for the second connecting lever 122, the elastic element 131 and the pressing component 132 of the other fastening mechanism are pierced through by the axle 1223 and disposed between the upper connecting lever 1221 and the lower connecting lever 1222. The elastic element 131 is disposed between the pressing component 132 and the upper connecting lever 1221. The pressing component 132 includes a spring piece 1321, and the spring piece 1321 is disposed between the lower connecting lever 1222 and the pressing component 132, making the pressing component 132, in a normal setting, pressed upward. One end of the pressing component 132 upward presses the elastic element 131 and the other end of the pressing component 132 upward presses the middle connecting lever 123 such that the middle connecting lever 123 is clamped and fixed between the elastic element 131 and the pressing component 132 without being pivotally rotated, thereby fastening the middle connecting lever 123.

Referring to FIG. 4 with reference to FIGS. 2 and 3, when the upper connecting lever 1221 of the first connecting lever 122 displaces along a direction of pressing P10, the upper connecting lever 1221 will downward press the elastic element 131 so as to enable one end of the pressing component 132 to displace downward; at the same time, the other end of the pressing component 132 will displace downward accordingly and thus release from the middle lever 123, enabling the middle connecting lever 123 to pivotally rotate so as to adjust the distance between the two handheld parts 110.

It should be mentioned that when the upper connecting lever 1221 displaces along the direction of pressing P10, the pressing component 132 also displaces downward, and the spring piece 1321 generates a force of rebound against the pressure from the pressing component 132 and the lower connecting lever 1222, enabling the pressing component 132 to rebound against the direction of pressing P10, thereby achieving the effect of resetting the pressing component 132.

Based on the above-mentioned structure of the external control pad, in order to adjust the distance between the two handheld parts 110, the user can alternatively press the first connecting lever 121 or the second connecting lever 122, or simultaneously press the first connecting lever 121 and the second connecting lever 122. The description of the present embodiment is based on the case of simultaneously pressing both. When holding the two handheld parts 110, the user can press with their thumbs, along the direction of pressing P10, on the first connecting lever 121 and the second connecting lever 122 respectively, in order to adjust the distance between the two handheld parts 100, and when the user releases their thumbs from the first connecting lever 121 and the second connecting lever 122, the distance between the two handheld parts is then fixed. Therefore, the user can quickly adjust the distance between the two handheld parts in an intuitive way so as to facilitate the incorporation of mobile devices with different dimensions into the external control pad, thereby improving applicability.

Besides, in the present embodiment, the external control pad 100 further includes two cushioning elements 140 for better functionality. The two cushioning elements 140 are individually disposed on the inner lateral side of each of the handheld parts and made of soft material such as foams and rubbers. When the mobile device 200 is placed between the two handheld parts 110, the two handheld parts 110 abut against the mobile device 200 through the two cushioning elements 140, and the two cushioning elements 140 is pressed and deformed so as to tightly stick along the outer edge of the mobile device 200, thereby providing a fixed and secure clipping of the mobile device 200.

Furthermore, as shown in FIG. 6, to electrically connect to the mobile device 200, the external control pad 100 further includes a port 150. The port 150 is, but not limited to, a USB port or a PS2 port and electrically disposed on any one of the handheld parts 110. The external control pad 100 electrically connects to the mobile device 200 by establishing a cable from the port 150 to the mobile device 200 so as for the user to control the apps running on the mobile device 200.

The second embodiment of the present invention is similar to the first embodiment in the aspect of the overall structure of the external control pad 100, and therefore only the differences between these two embodiments will be described as follows.

Figure 7:
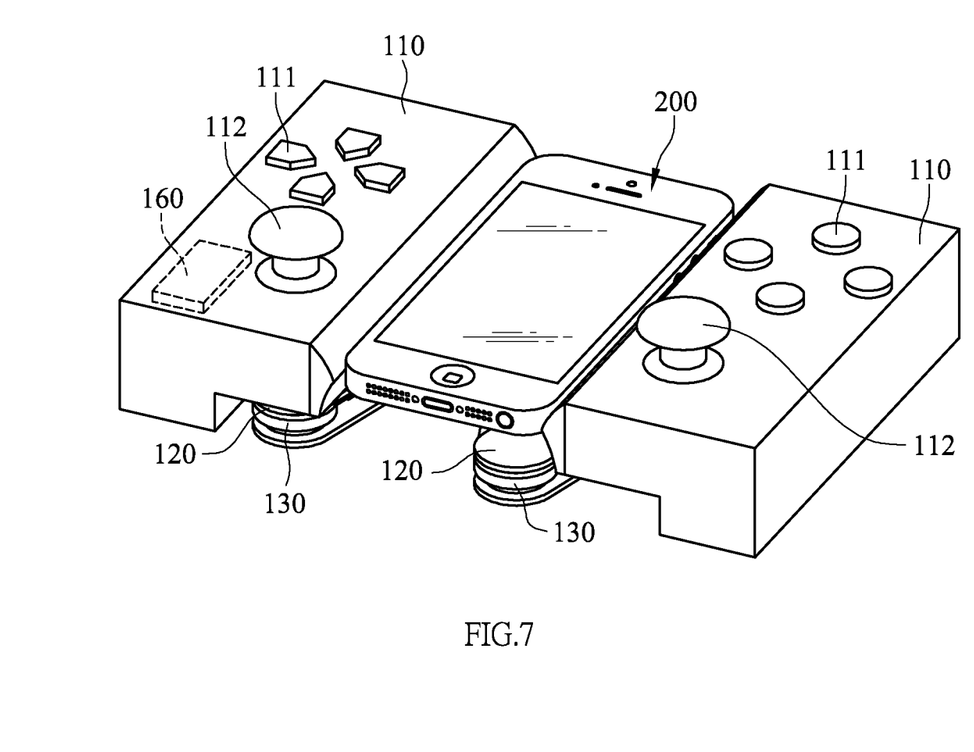
FIG. 7 is a perspective view of an external control pad incorporating a mobile device according to the second embodiment of the present invention.

Referring to FIG. 7 with reference to FIGS. 1-6, there is shown a perspective view of the external control pad 100 incorporating a mobile device according to the second embodiment of the present invention. The difference between the structures of the external control pad 100 of the first embodiment and that of the second embodiment is that in the second embodiment, there are individually provided two joysticks 112 on the two handheld parts 110 for users' gaming convenience. Besides, the external control pad 100 of the present embodiment further includes a wireless module 160. The wireless module 160 includes, but not limited to, a Bluetooth wireless module or an infrared wireless module. The wireless module 160, mounted on any one of the handheld parts 110, receives/sends control signals from/to the mobile device 200, so as to enable the user to control the apps running on the mobile device 200 without the hassle of cabling.

Figure 8:
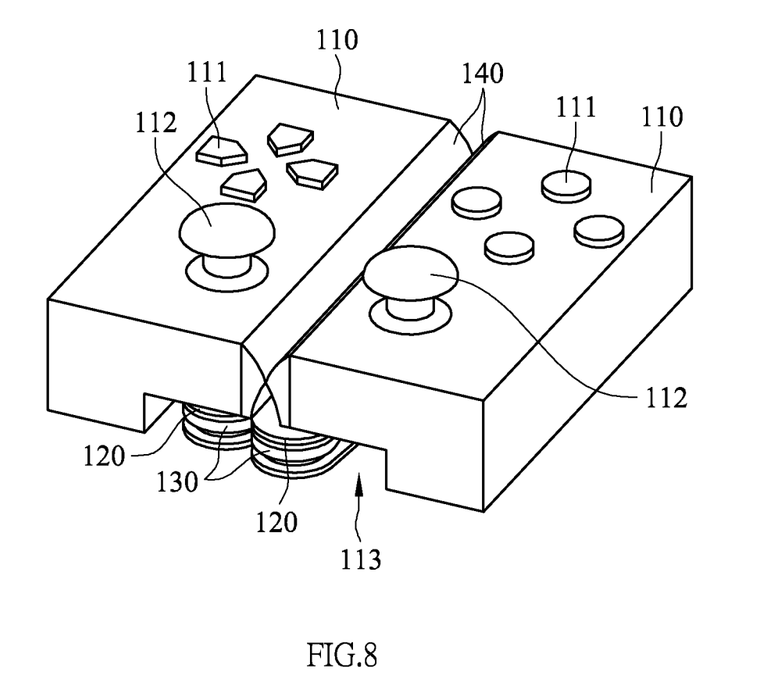
FIG. 8 is a perspective view of an external control pad when in collapse according to the second embodiment of the present invention.

The external control pad 100 as in the two embodiments also provides a collapsing mechanism for easy-to-store, as shown in FIG. 8. After the mobile device 200 is removed from the external control pad 100, if the user simultaneously presses the first connecting lever 121 and the second connecting lever 122, the movable set 120 and the two fastening mechanisms will rotate and retract into the grooves 113 at the bottom of the two handheld parts 110 so as to enable the two handheld parts 110 to abut against each other, thereby reducing the dimension of the external control pad 100. The two fastening mechanisms 130 provide an additional mechanism to fasten the external control pad 100 for easy to store and carry.

It should be clear that, through the description of the embodiments of the present invention, the movable set and the fastening mechanisms for the external control pad overcome the problems that the fastening mechanism or connecting apparatus of a prior-art gamepad is only compatible to a particular type of model or manufacture and may not be easy to use, thus making it difficult to quickly adjust the gamepad according to different dimensions of mobile devices, and the gamepad may be too bulky to be carried on-the-go, causing inconvenience to the game players.

The external control pad of the present invention is advantageous over conventional gamepads in that the structures of the movable set and the fastening mechanisms allow the user to easily adjust the distance between the two handheld parts according to different requirements such that mobile devices with different dimensions can be incorporated into the external control pad for better applicability. Additionally, the movable set and the fastening mechanisms are collapsible into the grooves of the handheld parts to enable the two handheld parts to move as close to each other as possible, thus making the external control pad smaller in dimension for easy-to-carry and convenient-to-store.

The foregoing embodiments are illustrative of the characteristics of the present invention to enable a person skilled in the art to understand the disclosed subject matter and implement the present invention accordingly. The embodiments, however, are not intended to restrict the scope of the present invention. Hence, all equivalent modifications and variations made in the foregoing embodiments without departing from the spirit and principles of the present invention should fall within the scope of the appended claims.

What is claimed is:

1. An external control pad, suitable for incorporating a mobile device, comprising:
    two handheld parts individually provided with at least one control button, wherein said mobile device is placed in between said handheld parts;
    a movable set and two fastening mechanisms, wherein:
    said movable set includes a first connecting lever, a second connecting lever, and at least one middle connecting lever, and one end of said first connecting lever is axially disposed on one handheld part and one end of said second connecting lever is axially disposed on the other handheld part, and two ends of said middle connecting lever are pivotally connected to the other end of said first connecting lever and the other end of said second connecting lever respectively, and when said first connecting lever and said second connecting lever individually rotate with respect to said handheld parts so as to enable said middle connecting lever to pivotally rotate, said handheld parts will move away from or close to, each other; and
    said fastening mechanisms are individually disposed in said first connecting lever and said second connecting lever, and each said fastening mechanism includes an elastic element and a pressing component, where said elastic elements are individually disposed between one pressing component and said first connecting lever, and between the other pressing component and said second connecting lever, and one end of each said pressing component abuts against the corresponding elastic element and the other end of each said pressing component abuts against said middle connecting lever such that said middle connecting lever is pressingly fixed in between each said elastic element and each said pressing component, and when said first connecting lever and/or said second connecting lever displace along a direction of pressing so as to abut against said elastic elements, one end of each said pressing component will displace along the direction of pressing and the other end of each said pressing component will release said middle connecting lever.

2. The external control pad as of claim 1, wherein said first connecting lever and said second connecting lever are individually provided with an upper connecting lever and a lower connecting lever connecting to each other via an axle, and each said fastening mechanism is disposed, through said axle, between each said upper connecting lever and each said lower connecting lever.

3. The external control pad as of claim 2, wherein each said pressing component is provided with a spring piece disposed between each said lower connecting lever and each said pressing component such that each said pressing component will, in a normal setting, press against the direction of pressing, and wherein when each said upper connecting lever displaces along the direction of pressing so as to enable each said pressing component to displace along the same direction, each said spring piece produces a force of rebound in response to the pressure from each said pressing component and each said lower connecting lever such that each said pressing component rebounds against the direction of pressing.

4. The external control pad as of claim 1, wherein said external control pad further comprises two cushioning elements individually disposed on the lateral side of each said handheld part, where each said cushioning element is made of soft material and said mobile device is clamped and fixed in between said handheld parts through said cushioning elements.

5. The external control pad as of claim 1, wherein said external control pad further comprises a port located on any one of said handheld parts for electrically connecting to said mobile device.

6. The external control pad as of claim 1, wherein said external control pad further comprises a wireless module mounted on any one of said handheld parts for receiving control signals from said mobile device or sending control signals to said mobile device.

7. The external control pad as of claim 1, wherein there is provided a groove along the bottom edge of each said handheld part, and said movable set and each said fastening mechanism are collapsible into said groove.

8. The external control pad as of claim 1, wherein each said handheld part is provided with a joystick.

9. The external control pad as of claim 1, wherein said control button is a direction button or a function button.

10. The external control pad as of claim 1, wherein said elastic element is made of rubber or foam.

* * * * *